United States Patent [19]
Koenck et al.

[11] Patent Number: 5,576,601
[45] Date of Patent: *Nov. 19, 1996

[54] DRIVE CIRCUIT FOR ELECTROLUMINESCENT PANELS AND THE LIKE

[75] Inventors: Steven E. Koenck; Roger L. Wolf, both of Cedar Rapids; Daniel E. Alt, Marion, all of Iowa

[73] Assignee: Norand Corporation, Cedar Rapids, Iowa

[*] Notice: The term of this patent shall not extend beyond the expiration date of Pat. No. 5,345,146.

[21] Appl. No.: 269,910

[22] Filed: Jul. 8, 1994

Related U.S. Application Data

[63] Continuation of Ser. No. 989,198, Dec. 11, 1992, Pat. No. 5,345,146, which is a continuation-in-part of Ser. No. 776,059, Oct. 11, 1991, abandoned.

[51] Int. Cl.[6] ........................................ G09G 3/10
[52] U.S. Cl. .................. 315/169.3; 315/219; 315/291; 315/307; 315/226; 315/158; 345/211; 345/77
[58] Field of Search ................. 315/158, 156, 315/169.3, 169.1, 169.4, 205, 226, 219, 291, 307; 345/77, 76, 211

[56] References Cited

U.S. PATENT DOCUMENTS

| 3,761,617 | 9/1973 | Tsuchiya et al. | 315/169.3 X |
| 4,859,912 | 8/1989 | Lippmann et al. | 315/169.3 |
| 5,345,146 | 9/1994 | Koenck et al. | 315/169.3 |

Primary Examiner—Robert Pascal
Assistant Examiner—Arnold Kinkead
Attorney, Agent, or Firm—Suiter and Associates PC

[57] ABSTRACT

A drive circuit for an electroluminescent panel applies an AC voltage cycle at typical power cycle frequencies by increasing the voltage profile in discrete, pulsed steps at a rate which is at least one order of magnitude greater than the AC frequencies applied to power the panel. A transformer through which the power pulses are applied to the panel is of smaller size than state of the art resonant transformers for applying power cycles to electroluminescent panels. The reduced size of the transformer is advantageous in packaging the drive circuit in portable devices using electroluminescent panels. The voltage steps at the leading edge of the voltage excursions of the AC cycle applied to the panel may be programmably changed to adjust the light output of the panel, or to adjust the power applied by the circuit to correspond to the size of the panel to which the power is applied.

2 Claims, 5 Drawing Sheets

DRIVE CIRCUIT FOR ELECTROLUMINESCENT PANELS AND THE LIKE

This is a continuation application of U.S. patent application Ser. No. 07/989,198, filed on Dec. 11, 1992, now U.S. Pat. No. 5,345,146, which in turn was a continuation-in-part application of U.S. application Ser. No. 07/776,059, now abandoned, filed Oct. 11, 1991, by Steven E. Koenck, Roger L. Wolf and Daniel E. Alt.

BACKGROUND OF THE INVENTION

The present invention relates to a drive circuit for applying power to a capacitive load, such as an electroluminescent device, typically an electroluminescent panel ("EL panel"). EL panels are capable of emitting light of rather uniformly diffused illumination from an area defined by a major surface of the respective device or EL panel. Electroluminescent panels are desirable backlighting sources for currently widely used and well known LCD displays. LCD displays are popular for use in portable apparatus because of their small size and low power consumption. However, advantages of low power consumption by the LCD displays may be totally offset by special power requirements for driving EL panels to provide backlighting for the displays under poor external lighting conditions.

Power management for backlighting EL panels becomes particularly critical when an LCD display is that of a portable data terminal or of a laptop or palmtop computer. These devices typically have LCD screens which are typically of a size of several square inches, requiring power to illuminate these comparatively large areas. In addition, use periods of the terminals or computers are extensive. A relatively larger screen size is generally necessitated by the need to display more information, hence requiring more time of an operator to work with the displayed information. Increased power needs for backlighting because of a larger screen size is therefore often coupled to further power requirements to satisfy longer operating periods. Portable data terminals are desirably designed for four to eight hours of continuous work without intervening power recharge requirements.

EL panels require AC (alternating current) power sources which operate at specified voltages and within an optimum frequency range. These voltages and frequencies are typically specified by the manufacturers of the panels. For example, a panel may be driven by typical line power, operating at 60 hz. Different manufacturers may recommend various higher driving frequencies for their respective panels, for example 100 to 1000 Hz, and voltages in a range of 75 to 200 volts RMS may be employed for an increased light output from the panels. These optimum frequencies and voltages are typically not readily available in portable electronic equipment.

A well known manner for applying power to an EL panel is through a secondary output of an autotransformer, coupled in series with the EL panel. The inductance of the autotransformer is configured with respect to the capacitance of the EL panel to have a resonant frequency at the desired operating AC frequency of the EL panel. The input drive circuit is then configured to drive the autotransformer at the resonant frequency of the autotransformer output circuit including the load element of the EL panel. The resonant autotransformer drive method is generally quite power efficient. Energy losses in the transformer and drive circuit and power consumption of the EL panel are supplied through the primary drive of the autotransformer. However, a significant disadvantage of the autotransformer is its physical size. For the resonant frequency to be the desired operating frequency for the EL panel, the inductance and hence the core size of the autotransformer is large in comparison with the physical size of the EL panel. In addition, the magnitude of the desired inductance requires a substantial number of turns of wire as the windings for the autotransformer. For most portable devices, the resulting size and weight increases are most undesirable. In addition, the components for the resonant circuit need to be carefully matched to the capacitance of the particular EL panel. Other arrangements for providing power to EL panels appear to be therefore desirable.

U.S. Pat. No. 5,027,040 discloses a switching invertor circuit supplying power to an EL panel from a dual mode DC (direct current) power supply. An inductor is coupled in series with the EL panel and is chosen with an inductance to cause the time resulting resonant frequency to be one-half of the desired operating frequency of the EL panel. For the second or negative driven half of the desired power cycle of the EL panel, the switching invertor circuit inverts the applied driving voltage. The referred to '040 patent discloses a synchronous switching operation of switching elements in the invertor circuit. Switching preferably takes place during periods of current reversal and, ideally, during conditions of zero current flow through the switching elements to minimize switching losses.

It should be realized that both of the above examples of the state of the art provide drives which are tuned to the capacitance of the EL panel to operate most efficiently. In view of the above, improved power circuits without a tuned inductor and including other improvements in panel illumination controls would greatly enhance the usefulness of EL panels for illuminating LCD displays.

SUMMARY OF THE INVENTION

According to the invention a drive circuit for an electroluminescent panel includes a first pulsing provision coupled to the panel for applying a series of high frequency positive current pulses to a first terminal of the panel. The high frequency pulses ramp up a voltage on the first terminal with respect to a second terminal of the panel to a predetermined positive voltage level. A second pulsing provision is coupled to the panel for applying a series of high frequency negative current pulses to the first terminal of the panel to ramp down a voltage on the first terminal with respect to the second terminal of the panel to a predetermined negative voltage level. A timing control is coupled to the first and second pulsing provisions. The timing control alternatingly activates each of the first and second pulsing provisions for the duration of a first predetermined time interval, respectively, and repeats the alternating activation in successive power cycles sequenced at timed intervals. The timed intervals correspond to a power cycle frequency of the panel.

The invention also may be applied to a drive circuit for an electroluminescent panel in which the light output of the panel may be adjustably controlled by the pulse width of high frequency drive pulses which incrementally change the leading edge of a voltage profile of a driving potential applied across the terminals of the panel. As the pulse width of the driving pulses is either increased or decreased, the charge applied to the panel is also increased or decreased.

Various other features and advantages of the invention will become apparent from the Detailed Description of the Invention below.

BRIEF DESCRIPTION OF THE DRAWINGS

The Detailed Description of the Invention including a detailed description of a preferred embodiment thereof will be best understood when read in reference to the accompanying drawings wherein.

DETAILED DESCRIPTION OF THE INVENTION

Figure 8:
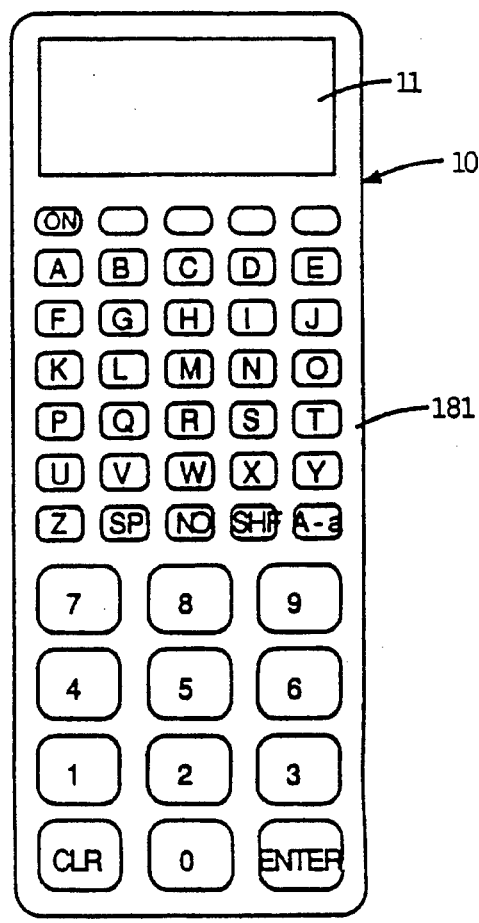
FIG. 8 shows schematically a frontal view of a computerized data terminal as a device to which the present invention advantageously applies.

Portable computers or portable computerized terminals, such as a computerized data terminal 10 shown schematically in FIG. 8, generally make use of LCD (liquid crystal) screens, such as a screen 11, to provide a visual interface for displaying data to an operator. Since LCD screen displays are not self-illuminating, the LCD screen 11 is desirably provided with a separate source of diffused backlighting.

Figure 1:
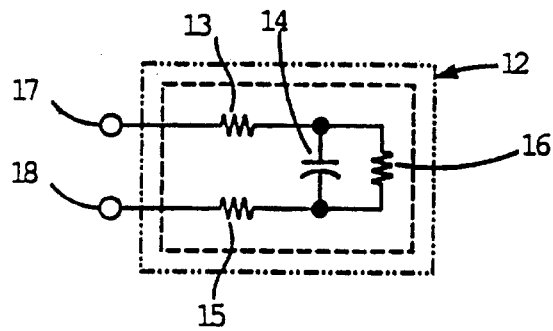
FIG. 1 is a schematic diagram of a typical electroluminescent panel in accordance with the state of the art.

FIG. 1 is a schematic representation of an electroluminescent panel 12 as an illustration of a known source of diffused light. The panel 12 may be depicted electrically as a less than ideal capacitor. Actual electrical characteristics of the panel 12 may be approximated by a series input resistor 13 which is coupled to one of the terminals of a capacitor 14. The series resistance of the panel 12 appears to stem from thin conductive films covering opposite major surfaces of the panel. A corresponding resistor 15 is shown as representing the sheet resistance on a second major surface of the panel 12. The presence of the series resistors 13 and 15 may be of little significance when the electrical characteristics of electroluminescent panels on the low end of a range of sizes for various applications are considered. However, panels for portable computerized terminals being generally of a more substantial size of, for example, two to one hundred or more square inches, exhibit the effects of the presence of the resistors 13 and 15. The electroluminescent panel 12 may further be characterized as a "leaky" capacitor 14. When charged to a measurable voltage, the voltage as well as any resulting luminescence will decay. The schematic representation of the panel 12 represents the internal charge decay be a resistor 16 which is coupled in parallel to the capacitor 14. The panel 12 is typically coupled into a drive circuit by terminals 17 and 18. The terminals 17 and 18 are, of course, structurally seen as being coupled directly to the electroluminescent panel 12. The capacitor 14, the parallel or shunt resistor 16 and the series resistors 13 and 15 merely approximate electrically functional equivalent elements internal to the panel 12 and are not separately distinguishable from the homogeneous body of the panel 12.

In that the panel 12 typically operates on AC (alternating current) power applications, the effective capacitor 14 is a bipolar capacitor, such that its terminals 17 and 18 may be coupled to a typical AC power source (not shown), or one of the terminals may be referenced to ground and an AC power signal may be applied to the other terminal. As is well known in the art, the capacitance and resistance of any particular panel 12 varies in proportion to the area of major surfaces of the panel 12, the major surfaces being in essence identical to the capacitor plates of the panel. Also, effective capacitance and resistance characteristics of the panels 12 may vary among various manufacturers of the panels. Thus depending on the commercial source of the panel 12, the characteristics of one panel of a given area may differ from those of another panel of identical area or size.

Figure 2:
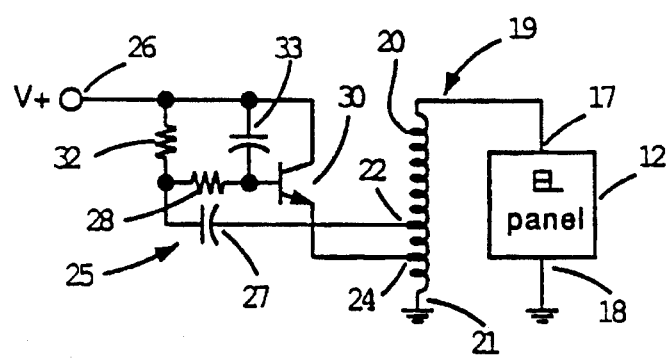
FIG. 2 is a schematic diagram of a state of the art resonant transformer drive circuit in accordance with the state of the art.

FIG. 2 shows a typical state of the art resonant driving circuit 19 for powering the electroluminescent panel at its preferred operating AC frequency. The panel 12 is coupled in series to a secondary or output path of an autotransformer 20. The terminal 18 of the panel 12 and a terminal 21 of the autotransformer 20 are shown as being coupled to common ground. A primary path of the autotransformer 20 with feedback tap 22 and primary tap 24 is coupled through a typical RLC oscillating circuit 25 to a DC (direct current) power source 26 (V+). The oscillating circuit 25 includes a capacitor 27 coupled to the feedback tap 22 and to a resistor 28 which is also coupled to the base of a power amplifier switch 30, represented by a typical N-P-N transistor 30. A resistor 32 is coupled to the node between the resistor 28 and the capacitor 27 and regulates the base current in response to the voltage at the node between the resistor 28 with the capacitor 27. The capacitance value of a feedback capacitor 33 coupled between the base and collector of the transistor amplifier 30 determines and is chosen to establish the cycle time of the resulting circuit and to match it to the natural frequency of the electroluminescent panel resulting from its own capacitance and the effective inductance of the autotransformer 20. The autotransformer 20 is typically a step-up transformer, thereby allowing the power source to be of a voltage lower than the typically required operating voltage of the panel 12. The inductance of the secondary path is chosen with respect to the capacitance and resistance of the electroluminescent panel 12 to have a resonant frequency equal to the desired frequency for operating the panel 12 at a chosen operating voltage with respect to ground. The total inductance of the autotransformer 20 depends consequently on the capacitance of the panel 12. It stands to reason that for the described resonant circuit 25 to drive the panel 12 at a predetermined desired power frequency and to a predetermined maximum voltage, the values of the described components need to be carefully matched and would differ for different capacitance values of the panel 12.

As may be realized, in providing a resonant circuit at a typical power frequency for the panel 12 typically 400 Hz or less, the inductance, and consequently the number of turns of wire on the transformer 20, and the size of the magnetic core of the coupling flux path become relatively large in comparison to the physical size of the panel 12. The relatively large size of the transformer is typically undesirable for compact packages of portable terminals with LCD screens. Characteristics among the panels 12 from various sources differ. Consequently, the task of selecting and matching components for the drive circuit 25, such as the resistors 28, 32 and the capacitor 27 becomes cumbersome, not to mention the added packaging difficulties because of the relatively large size of the transformer 20.

Figure 3:
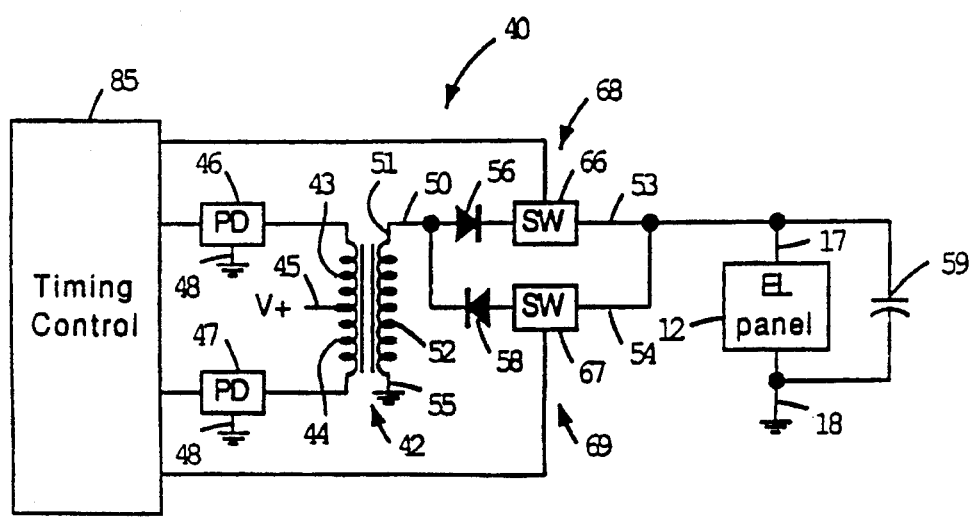
FIG. 3 is a schematic diagram of a drive circuit for an electroluminescent panel to illustrate advantageous features of the present invention.

The schematic diagram in FIG. 3 represents a drive circuit, designated generally by numeral 40, for providing AC power to an electroluminescent panel 12 in accordance with the present invention. The drive circuit 40 includes a high frequency transformer 42 with a primary path extending through primary windings 43 and 44 between a preferably center-tapped power terminal 45 switchable to ground by respective, electronic first and second power pulsing devices 46 and 47, a common ground designated by numeral 48. The power devices 46 and 47 are preferably N-channel MOS power transistors, selected for their fast response time and low on-resistance. The MOS transistors may be driven, for example, at speeds to apply a series of power pulses at a preferred frequency of, for example, 100 kHz to the respective primary windings 43 and 44. The pulsing frequency is also referred to as a "high" frequency as contrasted with the desirable AC power frequency at which the panel 12 is typically driven. Because of the relatively high frequency at which the transformer 42 is driven, the physical size of the transformer 42 is smaller than that of a prior art transformer of similar power characteristics, though driven at the power frequency of the panel 12, such as the transformer 20 in FIG. 2. Pulsing frequencies applied to the transformer 42 may be ranging, for example, between 50 and 500 kHz, which frequencies are, for purposes of describing and defining the invention in precise terms, designated as "high frequencies", as opposed to the comparatively low power cycle operating frequency of the panel 12. Power cycle frequencies for the panels 12 would typically be less than 1000 Hz, depending on specifications provided by suppliers of the EL panels.

A secondary transformer path 50 preferably has a first terminal 51 of a secondary winding 52 selectively coupled to the first or the power terminal 17 via a positive or charging branch 53 and via a negative or discharging branch 54. The transformer 42 is preferably a step-up transformer with a voltage output from the secondary winding 52 being, for example, 50 volts RMS or approximately 120 volts, thus greater than the voltage V+ of a typical supply, which might be +5 to 7 volts, for example. The second terminal 18 of the panel 12 and a second terminal 55 of the secondary winding 52 may be coupled to each other by both being coupled to a common ground connection, as shown in FIG. 3. As an alternative embodiment in accordance herewith, also discussed in reference to FIG. 7, it may be desirable to couple the terminals 18 and 55 directly to each other without coupling the return path, or any part of the secondary current loop to ground. Referring back to FIG. 3, the positive or charging branch 53 includes a series-coupled diode 56, a cathode of which is directed toward the terminal 17 of the panel 12. The negative or discharging branch 54, being coupled in parallel with the charging branch 53 between the winding 52 and the panel 12, includes a series coupled diode 58, the anode of which is directed toward the power terminal 17 of the panel 12. The charging branch 53 and the discharging branch 54 are used alternatingly and mutually exclusively of each other to transfer either a series of positive current pulses or a series of negative current pulses to the power terminal 17 and to a respective terminal of a capacitor 59. The capacitor 59 of the circuit 40 is coupled in parallel across the terminals 17 and 18 of the electroluminescent panel 12 to protect the panel from voltage "spikes" or pulse transitions. Mutually exclusive operation of the charging and discharging branches 53 and 54 are implemented by the operation of first and second switches 66 and 67. The first and second switches 66 and 67 are coupled into the charging branch 53 and discharging branch 54, respectively. Preferably, the switches 66 and 67 are disposed between the panel 12 and the respective one of the diodes 56 and 58 of the branches 53 and 54.

The switches 66 and 67 have two distinct special functions of particular significance in the operation of the circuit 40. A first function, as described above, is implemented when one of the switches 66 and 67 selectively decouples a respective one of the switched branches 53 and 54 from the circuit 40 at least during a time period when the other of the two branches is operational.

For example, an operational period may be selected as a representative power cycle of the panel 12 to begin with the activation of the pulsing device 46. The period T6–T7 (FIG. 6) denoting continuous operation might be substituted for the initial start up period prior to the event T1. Of course, any other starting point may be selected in describing a complete power cycle for driving the panel 12. The period during which the pulsing device generates a series or sequence of high frequency current pulses in the transformer 42 is that portion or period of the AC power cycle during which the first lobe of the operating voltage of the panel 12 is generated. If during a first time period or first pulsing period of the power cycle the first pulsing device 46 is driving current pulses into the primary winding 43, then the first switch 66 disposed in the positive or charging branch 53 is closed and the second switch 67 in the negative or discharging branch 54 is open. The open switch 67, in this example, isolates the discharging branch 54 functionally from the circuit 40. It necessarily follows that current flow through the secondary winding 52 during the first pulsing period is in the same direction as that through the positive or charging branch 53. The current flow direction through the output or secondary winding 52 of the transformer 42 which flows through the positive or charging branch 53, such as the current flow during the first pulsing period, is therefore designated as positive current or charging current. The positive current flows through the winding 52 from the terminal 55 toward the terminal 51, charging the panel 12 through the charging branch 53. Conversely, the second switch 67 is closed and the first switch 66 is open for at least the duration of a similar second pulsing period of the selected power cycle. During the second pulsing period following the first pulsing period the second pulsing device 47 is applying negative current pulses to the primary winding 44 of the transformer 42. The voltage output from, and the direction of the resulting current flow through, the secondary winding 52 is during such second pulsing period also reversed with respect to its voltage output and current during the first pulsing period. The second pulsing period is the portion of the AC power cycle during which the operating voltage in the opposite direction to that in the first pulsing period is generated across the terminals of the panel 12. During any second pulsing period the current is designated to flow out of the terminal 17 of the panel 12. Any current flow through the secondary winding 52 which tends to discharge or lower a positive voltage on the terminal 17 of the panel 12 is designated herein as being a discharging or negative current in the negative or discharging direction. The current flow direction through the secondary winding 52 and through the discharging branch 54 during the second pulsing period is therefore designated herein as negative current flow.

In the described operational mode, the first and second switches 66 and 67 function as part of first and second pulsing arrangements 68 and 69, respectively, by which the panel 12 may be positively or negatively charged in a number of consecutive incremental steps, to ramp up or ramp down a voltage across the panel 12 to preselected positive or negative voltage levels. It should be realized that without isolating the non-selected branch, the counter current pulses resulting from the collapsing magnetic field in the transformer 42 would also be applied to the panel 12, the net effect of their application tending to nullify any stepped voltage change across the first and second terminals 17 and 18 of the panel 12. The first pulsing arrangement 68 consequently includes the actual first pulsing device 46, and the positive or charging branch 53 including the diode 56 and the switch 66. The second pulsing arrangement 69 includes the second pulsing device 47, and the negative or discharging branch 54 including the diode 58 and the switch 67.

The amount of charge transferred to the panel 12 as a result of each charging or positive pulse through the charging branch 53 or each discharging or negative pulse through the discharging branch 54 is determined by the amount of current which flows into the panel as a result of the pulse. An effective charge transfer to the panel 12 appears to be improved by the external, parallel coupled capacitor 59. Voltage pulses of a desired magnitude are generated across the secondary winding 52. However, the actual flow of charges as a result of each voltage pulse is also dependent on the resistance in the respective current loop. The voltage pulses generated across the terminals 51 and 55 of the secondary winding 52 appear also, except for typical, small diode drops, across the terminals 17 and 18 of the electroluminescent panel 12. It would therefore appear that as each respective series of either positive or negative pulses is applied across the terminals 17 and 18 of the panel 12 the capacitor 14 (See FIG. 1) of the panel 12 is correspondingly charged. Further in reference to FIG. 1, the voltage pulses across the terminals 17 and 18 of the panel 12 become attenuated by voltage dividers formed by internal equivalent series resistances 13 and 15, and the parallel shunt or leakage resistance 16. The actual light-producing voltage and charge across the panel 12 is therefore reached less readily because of the series resistance values represented by the equivalent resistors 13 and 15.

The problem of getting an effective charge to the panel 12 appears to be significant when the panel 12 is of a comparatively large area or size. The series resistances are in essence the result of thin film electrodes formed over both major surfaces of the electroluminescent panel. The series resistances of the panel 12 are, consequently, larger in comparatively larger panels on which the charges become distributed over longer distances from contact edges. On the other hand, the parallel or shunt resistance of the resistor 16 tends to vary inversely proportional to the size or area of the panel 12. Hence, doubling the electroluminescent area of the panel 12 doubles the capacitance of the panel but substantially cuts the resistance of the resistor 16 in half.

The parallel coupled external capacitor 59 not only protects the panel 12 from excessive spikes of the high frequency pulses but substantially alleviates the discussed problem of efficiently ramping the panel 12 to the desired operating voltage in each half of a power cycle. The external capacitor 59 provides a low resistance current loop for ramping the voltage across the terminals 17 and 18 with charges becoming stored in the capacitor 59. The charges stored on the capacitor 59 are transferred to the capacitor 14 which represents the panel 12 on a continual basis even during the off-duty cycle time between each of consecutive positive or negative high frequency pulses.

The switches 66 and 67 also serve another function of selectively coupling the power terminal 17 of the panel 12 to the secondary winding 52 of the transformer 42 at a time in the power cycle of the panel 12 when a reversal of the voltage on the panel is to be initiated. At such time the pulsing devices 46 and 47 are idle and no power is applied to the primary path of the transformer 42. The transformer secondary winding 52 acts, with the primary path being idle, as an inductance coupled in series with the capacitance of the electroluminescent panel 12 and the external capacitor 59. Advantageously, positive or negative charges stored in the panel 12 at the time of closing the respective switch 66 or 67 transfer energy during their discharge through the secondary winding 52 to the magnetic field of the transformer 42. The capacitor 59, being essentially a loss-less component, apparently maintains an optimum driving voltage across the terminals 17 and 18 of the panel 12 when current flow through the internal or parasitic series resistors 13 and 15 would tend to reduce the driving voltage across the terminals 51 and 55 of the secondary winding 52. It is understood that the inductance of the secondary winding 52 of the transformer 42 performs the same energy storage function for both positive and negative current flow through the secondary winding 52. When the voltage, whether positive or negative, on the panel 12 across the terminals 17 and 18 has essentially approached a neutral or ground potential and the current flow reaches its maximum value and begins to decrease, the magnetic field built up in the transformer 42 as a result of the current begins to collapse. Energy stored in the magnetic field is transferred to the secondary winding 52 and the voltage of the panel 12 is driven in the direction toward the voltage reversal on the capacitor 59 and the panel 12. When the energy stored in the transformer 42 has essentially been transferred to initiate the voltage reversal across the panel 12, the respective pulsing elements 46 or 47 are activated to actively drive the transformer 42, ramping the voltage either up or down, further toward a predetermined voltage level of polarity opposite to that of the most recently established voltage level.

Figure 6:
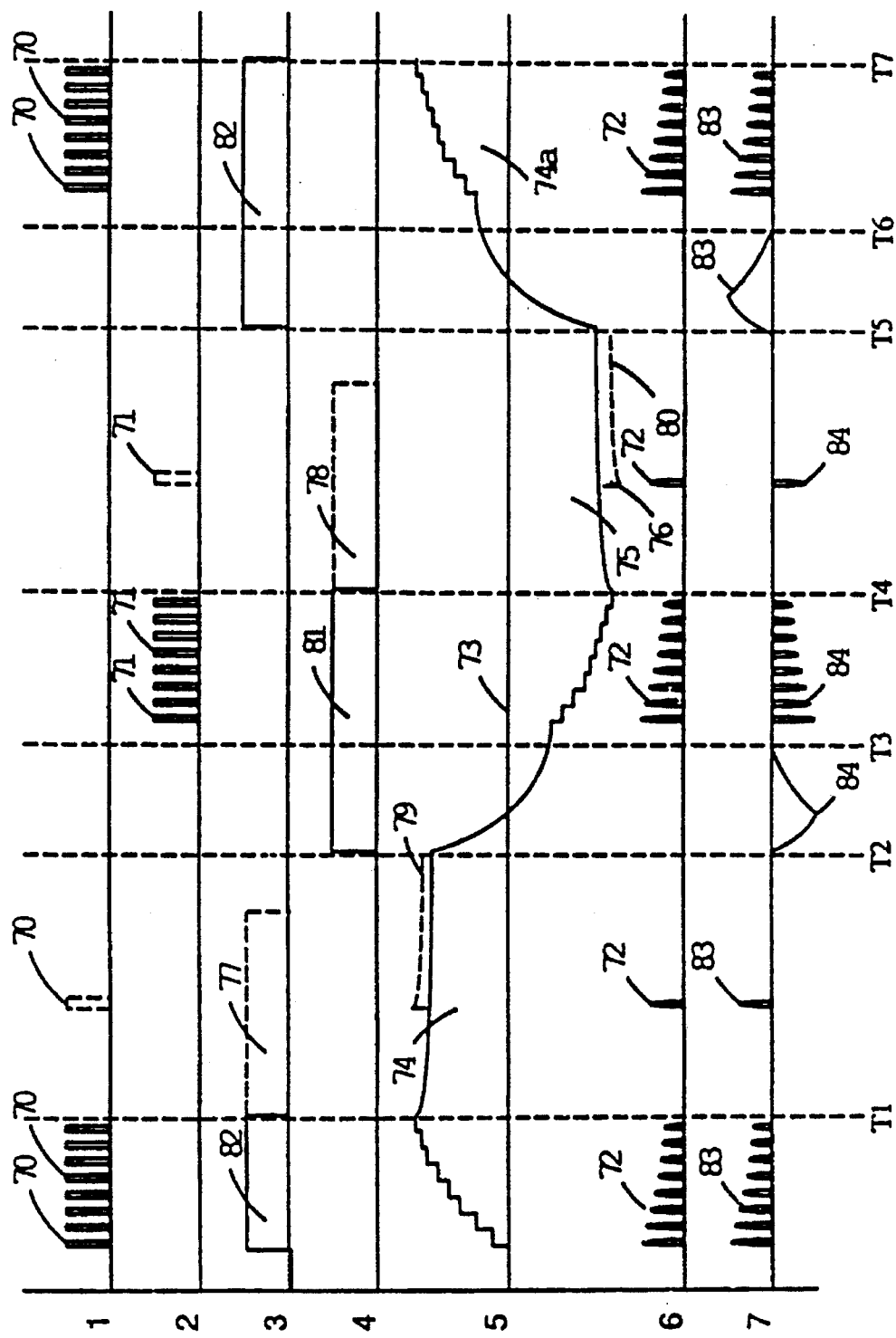
FIG. 6 is a schematic diagram illustrating schematically the waveforms of the drive circuits shown in FIGS. 3 and 4, for example, the control circuit showing timing functions for controlling some or all of the switching functions in accordance with the present invention.

In reference to the timing chart of FIG. 6 and the circuit 40 in FIG. 3, graph "5" in FIG. 6 shows a representative voltage profile of the described circuit 40 to drive the panel 12 with an AC voltage of a specified frequency, which may be 800 Hz., for example. The voltage profile applied across the terminals 17 and 18 of the electroluminescent panel 12 is driven by voltage pulses 70 shown in graph "1", as generated by the first pulsing arrangement 68 and referred to as charging or positive pulses, and by voltage pulses 71 shown in graph "2", as generated by the second pulsing arrangement 69 and referred to as negative or discharging pulses. The voltage pulses result in corresponding current pulses 72 at the terminal 45 of the transformer 42. The current pulses 72 alternately energize the primary windings 43 during what is referred to as the first pulsing period, or 44 during what is referred to as the second pulsing period, depending on whether the pulsing device 46 or 47 is pulsed. High frequency secondary current pulses charge or discharge the terminal 17 of the panel 12 with respect to the terminal 18 accordingly. The generated voltage profile will be described for the period of a complete power cycle, such as for the period between T1 and T7. Just prior to the time T1, and as an initial power-on occurrence, a voltage start up profile across the terminals of the panel 12 shows a voltage being ramped up in discrete voltage steps from a neutral voltage to a maximum desired positive voltage level which is reached at T1. A ground reference or neutral voltage level across the terminals 17 and 18 of the panel 12 is indicated at 73. Any subsequent power cycle would include, instead of the initial start up profile, a voltage profile as shown for the time period between T5 and T7. Of course a complete power cycle may be chosen to begin at any point of the voltage profile shown in graph "5" and continue until the profile repeats itself to start the subsequent cycle.

Graph "1" shows the operation of the pulsing device 46, switching a series of the voltage pulses 70 during the first pulsing period of the power cycle. The voltage pulses 70 result in a corresponding series of current pulses at a preferred frequency of 100 kHz. through the primary winding 43 (as shown in graph "6"). In response, a positive current flow is induced through the branch 53, the switch 66 being closed at least for the period during which the device 46 is being pulsed, while the correspondingly open switch 47 blocks a counter current flow from being applied to the transformer. When the voltage level, as shown at T1, has reached the desired peak value with respect to the reference 73, the pulsing action of the device 46 is stopped and the switch 66 may be opened. However, it should be noted that the opening of the switch 66 does not have to coincide with the completion of the last pulsing action. The diode 56 blocks a reverse flow of current through the branch 53, and the switch 67 remains open until the panel 12 is discharged at T2.

Between T1 and T2 the charge stored in the panel 12 drives the illumination phenomenon of the electroluminescent panel, the charges being dissipated by the internal equivalent circuit, as, for example the resistor 16 shown in FIG. 1. As power is used for illuminating the panel surfaces, the voltage stored between the terminals 17 and 18 decreases. As the voltage across the terminals 17 and 18 decreases, the light output by the panel also decreases. At time T2 the voltage on the EL panel 12 has decreased to a level at which the panel is to be charged with the opposite polarity for the negative half of the power cycle. At T2, the switch 67 is closed to establish a discharge path for the panel between the terminal 17 of the panel 12 through the diode 58 of the discharging branch 54, through the secondary winding 52 of the transformer 42 to the ground terminal 55 and consequently to the coupled terminal 18 of the panel 12. When switch 67 closes, the transformer 42 is not being used as a transformer, in that both pulsing devices 46 and 47, and hence, the primary windings 43 and 44 are open. The transformer functions therefore as an inductor, temporarily storing energy from the discharge current in its magnetic field, and then continues to drive the voltage on the terminal 17 of the panel 12 to a negative voltage level with respect to the terminal 18 or to ground.

At time T3, when the induced current has diminished, the device 47 is operated during a second pulsing period of the power cycle at the same preferred pulsing rate as was the device 46 prior to time T1, or as the device 46 will be operated during any first pulsing period of any subsequent power cycle. A sequence of the voltage pulses 71 applied to the primary winding 44 of the transformer 42 by the device 47 are shown in graph "2". The switch 67 remains closed while the device 47 is applying power pulses to the transformer 42. A resulting current flow at the power terminal 45 is shown as a second sequence of pulses in graph "6" of FIG. 6. As the applied power pulses through device 47 continue, corresponding current pulses in the secondary path are applied to the terminal 17 of the panel 12. Negative current flow into the terminal 17, illustrated as the "downward" directed pulses in graph "7", during the period between T3 and T4 results in an incremental ramp down of the voltage to a predetermined desired negative voltage level. The lowermost voltage level is reached at time T4, as shown in graph "5". At T4 the operation of the switch 47 ceases and the panel 12 becomes again decoupled from the drive circuit 40.

Between T4 and T5 the electrical action taking place may be again be limited to the current flow within the panel 12 to generate its illumination, except that the illumination process now functions with voltages of opposite polarity with respect to the previously described power half cycle depicted as positive voltage lobe 74 in graph "5". The negative charge decreases in the process, the negative voltage or charge on the panel 12 decreasing toward the ground or neutral potential 73. Light output from the panel 12 decreases with a decreasing potential difference between the terminals 17 and 18 of the panel 12. Thus, at T5, the switch 66 is closed to reverse the voltage on the panel 12 and drive the voltage on the panel 12 toward the positive cycle portion of a subsequent power cycle. The closed switch 66 couples the negatively charged terminal 17 of the panel 12 to ground through the inactive transformer 42 and, hence, to the also grounded second terminal 18 of the panel 12. Again as in the period between T2 and T3, the current flow of negative charge from the panel 12 through the secondary winding of the transformer 42 to ground stores energy and continues to drive the voltage on the panel 12 past the ground potential toward a positive voltage. During the period between T6 and T7, the device 46 is pulsed to drive the voltage on the terminal 17 of the panel 12 to the desired positive peak voltage just as during the time period immediately preceding T1. The switch 66 remains closed during this period and the charge on the panel 12 is ramped up again to the upper desired voltage level which is shown at T7 in graph "5". The described functions over the time period between T1 and T7 are now repeated in subsequent power cycles at the characteristic frequency of the electroluminescent panel 12.

The frequency of the power cycle, (T1–T7), would typically be chosen to be in a range of frequencies recommended by the manufacturer of the particular electroluminescent panel 12. Though the first voltage lobe 74 shows a variation in that the voltage on the power terminal 17 is ramped up with no inductive effect transferred from the transformer 42, when operating under steady state conditions, each subsequent power cycle of the described embodiment includes inductive recovery in each of the alternating positive and negative voltage lobes, such as shown in lobes 74a and 75, for example. In a graphic representation of the power cycle (graph "5"), the size of the area defined between the voltage curve 76, whether positive or negative, and the ground reference 73 is indicative of the power available to illuminate the panel 12. The intensity of illumination is related to the potential difference between the terminals 17 and 18 and increases with increased potential differences.

The operation of the described drive circuit 40 may then be controlled to conveniently change or control the intensity of the light output from the panel 12 by varying the shape of the voltage lobes of the power cycle applied to the panel 12. The effective voltage between the terminals 17 and 18 of the panel 12 may be altered without significantly changing the input voltage by stepping the voltage to attain the respective peak voltages more or less rapidly. The discharge time from the panel 12 through the inductance of the transformer 42 is essentially a non-variable that is determined by the inductance value and the capacitance of the panel 12. However, the driven portion of the voltage reversal of the power cycle may be altered to some extent by the pulsing action of the respective devices 46 and 47. Moreover, changes may be made by controlling the pulse width of the voltage pulses 70 and 71 of the devices 46 and 47 according to which the current is driven into the primary windings 43 and 44 of the transformer 42.

In the above example in reference to FIGS. 3 and 6, a preferred duty cycle of the devices 46 and 47 is chosen to be 35 percent. At a preferred pulsing frequency of 100 kHz, during each pulsing period of ten microseconds, the devices 46 and 47 will cause power to be applied to the respective windings 43 and 44 for a period of 3.5 microseconds. Each time one of the devices 46 and 47 is pulsed, the panel 12 becomes charged with a parcel of electrical charge of either positive or negative polarity. The pulsing rate of the devices 46 and 47 and the duty cycle of the devices determine the slope or steepness of the leading edge of each voltage lobe, the slope being defined by the stepped ramping operation as can be seen from graph "5" in FIG. 6. As the pulse width of the charging pulses through the devices 46 and 47 is increased, the current output on the secondary winding 52 also increases. Each pulse transfers a greater amount of charge to the panel 12. Hence each voltage step on the panel results in a correspondingly greater rise, provided all other parameters remain unchanged.

It follows that for any given panel 12, the duty cycle of the devices 46 and 47 controls the voltage applied to the panel 12. Hence, the light output from the panel 12 can be increased or decreased by a corresponding increase or decrease in the duty cycle of the devices 46 and 47. It needs to be noted that as the slope of the stepped voltage change increases, with the frequency of the power cycle of the panel remaining the same, the time periods T1–T2 and T4–T5 also increase. Since these periods are essentially passive or internal discharge periods, the potential differences across the panel 12 over the now longer periods decrease to a lower value as compared to the original values at times T2 and T5.

A further variation of the operation of the circuit 40, though currently not preferred, contemplates controlling the peak voltage at or near the respective peak voltage values, as shown at T1 and T4. Graphs "3" and "4" in FIG. 6 show extended periods 77 and 78 during which the respective switches 66 and 67 may remain closed. The pulsing devices 46 and 47 in turn may be pulsed intermittently to regulate the voltage reduction during the time intervals T1–T2 and T4–T5 in each of the respective power cycles, as indicated by the alternate voltage profiles 79 and 80 during the periods. The extended periods 77 and 78 of closure of the respective switches 66 and 67 terminates prior to the closure of the other of the two switches during the reversal and ramping periods 81 and 82, for example. The direction of alternate current flow into and out of the terminal 17 of the panel 12 as a result of the alternately switched states of the switches 66 and 67 is illustrated in graph "7". Graph "7" shows positive current flow 83 during periods 82 and 77 of closure of the switch 66 and negative current flow 84 during periods 81 and 78 of closure of the switch 67.

The above described preferred slope adjustment of the voltage profile, or the contemplated voltage control during the time periods T1–T2 and T4–T5, permits the circuit 40 to drive electroluminescent panels 12 of various capacitances without a need to physically substitute components of the circuit 40 for components with other matched values. If the capacitance of one particular panel is less than that of another, the pulse width of the devices 46 and 47 may be decreased for the first panel with respect to that of the second one. The panel with a smaller capacitance requires less charge to raise the panel to the predetermined peak voltage and is therefore powered with more narrow current pulses than the panel with a greater capacitance. The second panel with greater capacitance and charged with current pulses having a greater pulsewidth would show substantially the same voltage profile with the rise times on both panels being the same. Hence, assuming equal voltage to light output of the two panels, the brightness of both panels is essentially the same.

In FIG. 3, a timing and control circuit 85 is schematically shown as being coupled to the pulsing devices 46 and 47 and to the switches 66 and 67 to produce the functions and voltage profile on the panel 12 as described above. The above pulsing frequency of 100 kHz being a preferred frequency, it should be recognized that pulsing frequencies in a range between 50 to 500 kHz would be possible.

Figure 4:
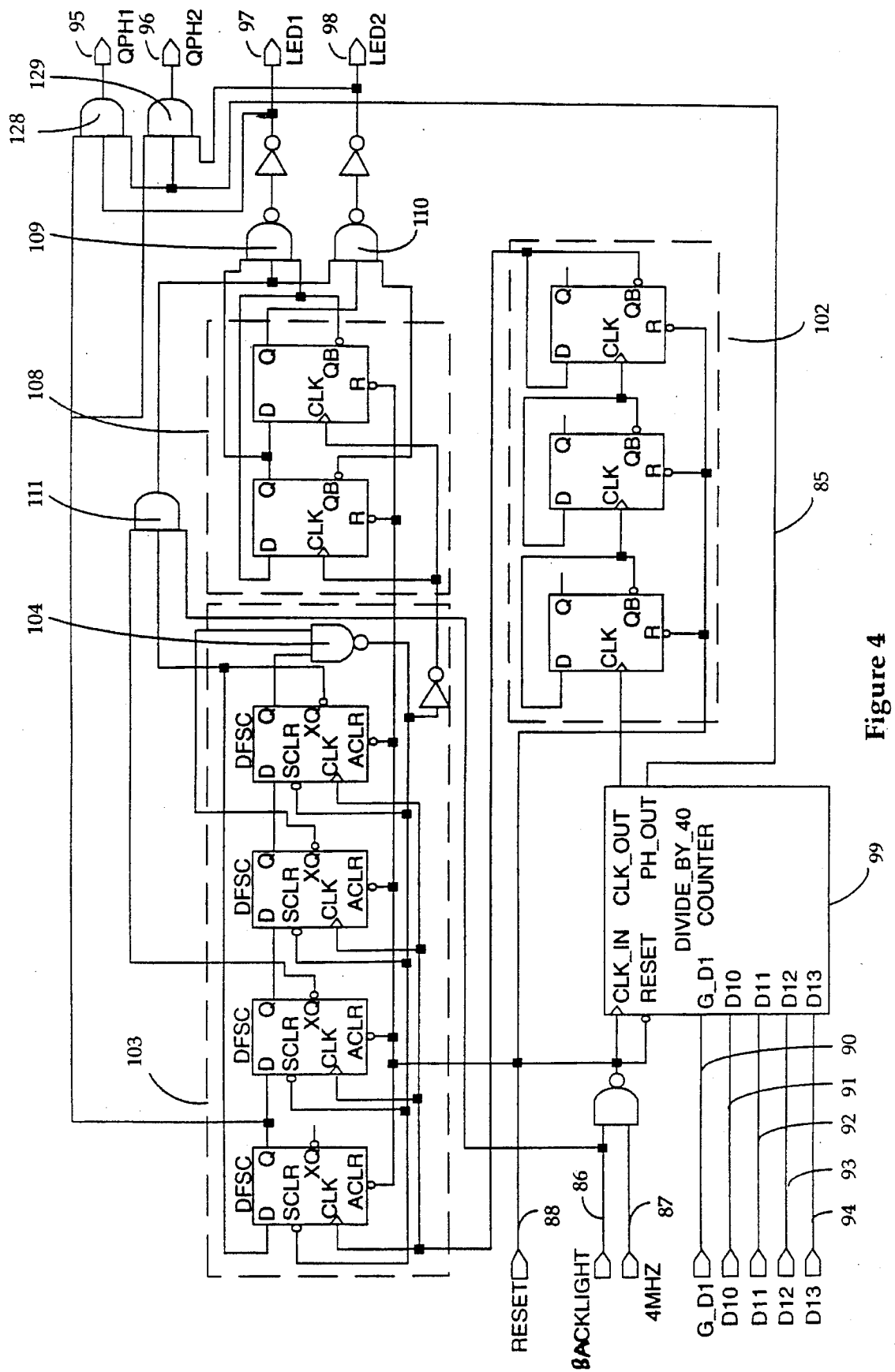
FIG. 4 is a more detailed schematic diagram of a representative timing and control circuit shown in FIG. 3.
Figure 5:
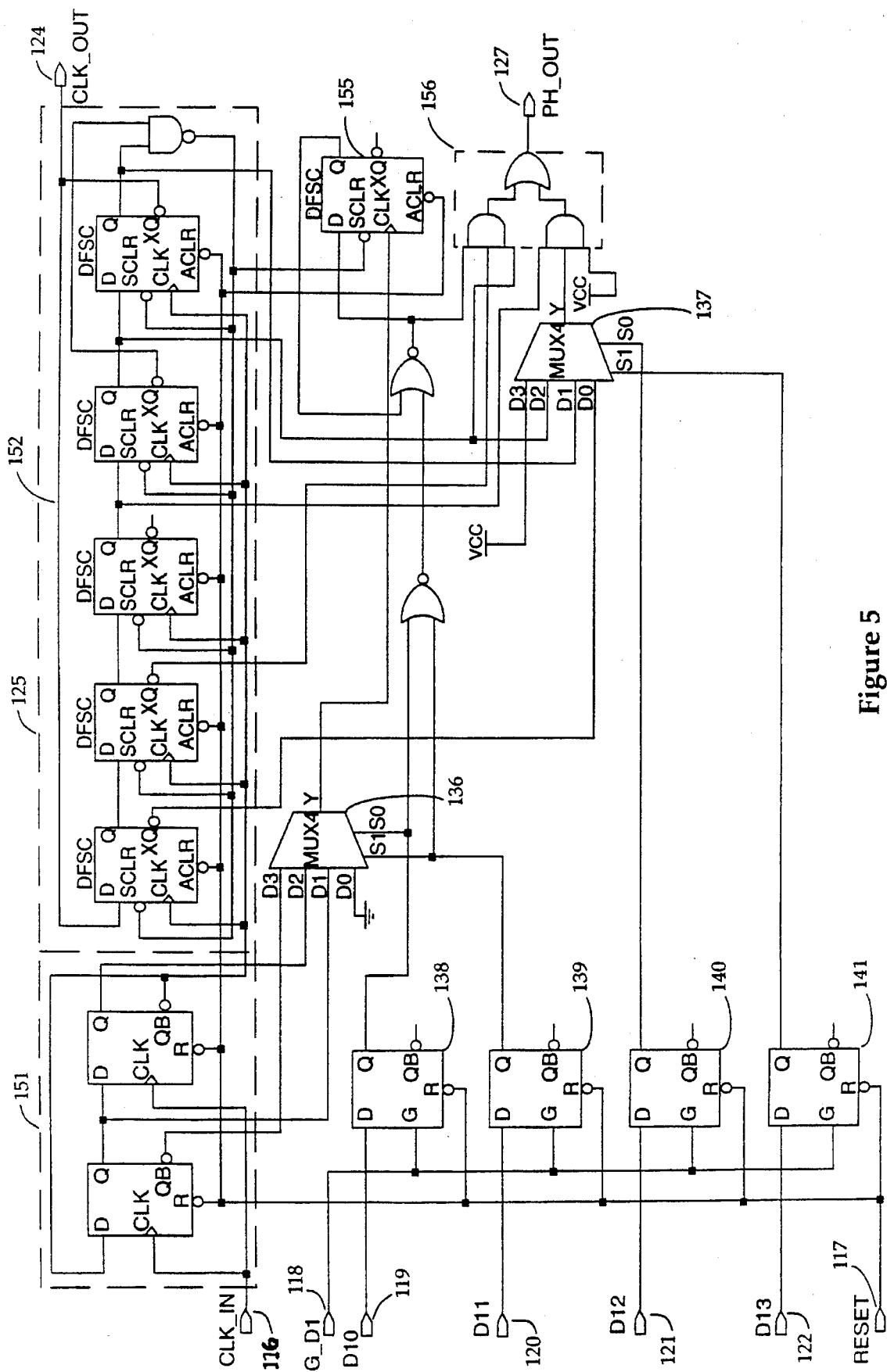
FIG. 5 shows further details of a pulse width adjust feature of the circuit shown in FIG. 4.
Figure 7:
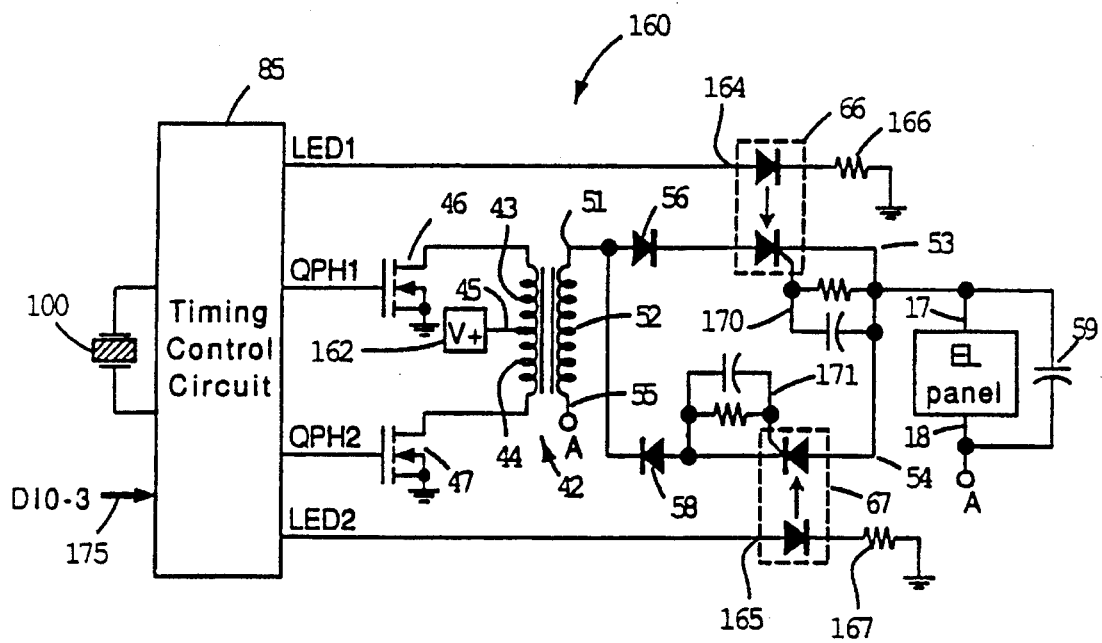
FIG. 7 is a schematic diagram of a preferred embodiment of the circuit depicted in FIG. 3, showing particular elements of the preferred embodiment of the present invention.

FIGS. 4 and 5 show the timing and control circuit 85, which is a specific embodiment of the control circuit 85 of FIG. 3 with certain advantageous timing sequences which are particularly applicable to a particular embodiment of the invention shown in FIG. 7. The circuit 85 depicted in FIG. 4 shows on the left side a backlight enable input contact 86 (BACKLIGHT), a clock input contact 87 (4 MHZ), a reset contact 88 (RESET), a data strobe input contact 89 (G_DI), and four data input contacts 91 through 94 (DI0 through DI3). Output contacts 95 and 96 (QPH1 and QPH2) provide the high frequency control signals to drive the described pulsing devices 46 and 47, respectively. Output contacts 97 and 98 (LED1 and LED2) provide the respective control signals to drive the switches 66 and 67, respectively, as may be further seen in reference to a preferred embodiment of the circuit 40 shown in FIG. 7.

A "Divide by 40 Counter", designated generally by the numeral 99 receives a clock signal from a preferred 4 MHz crystal 100 (see FIG. 7) and implements a divide-by-40 operation thereon. The resulting 100 kHz divided clock signal (CLK_OUT) is a 50 percent duty cycle signal which is applied to further register circuits and is gated to define the cycle events which may be applied in the preferred embodiment shown of the invention as shown in FIG. 7, for example. The 100 kHz is applied to a further divide-by-eight circuit 102 consisting of three typical "D" flip-flop elements. The output from the circuit 102 is used to clock a 4-bit counter 103 having eight defined states. The counter 103 is known as a "Johnson" counter with the characteristic that any state or combination of states of the counter 103 can be decoded with a single two-input gate. A NAND-gate 104 gating a last output state of the counter 103 with the inverse of an output state immediately preceding the last output state provides a synchronous clear signal for the counter 103. The synchronous clear signal operates to force undefined states of the counter 103 into one of its defined states. The output from the counter 103 is also applied to a 2-bit "Johnson" counter 108. The counter 108 defines which of the switches 66 or 67 are operated at any given time within any given cycle. Gates 109 and 110 decode respective logic states from the counter 108 and from the counter 103 through a further AND-gate 111. The gate 111 also couples a backlight enable signal (BACKLIGHT) through the contact 86 into the output, thereby inhibiting the operation of the switches 66 and 67 when the BACKLIGHT signal is low.

In reference to the above description of FIG. 6, various modes of operation of the switches 66 and 67, for example, were discussed. The preferred embodiment of the control circuit 85 in accordance with the schematic diagram of FIGS. 4 and 5, selects certain advantageous optimum operational states for the switches 66 and 67 as will be discussed further with respect to FIG. 7. A particular advantage of the described control circuit 85 is a pulsing output at a desired frequency with programmable pulse width definitions for the operation of the pulsing devices 46 and 47 (see FIG. 7). The counter circuit 99 shown in FIG. 4 schematically as a function block, includes in addition to the described divide by forty function a further timing signal generating function (PH_OUT).

Input contacts to the counter circuit 99, shown best in FIG. 5, are contacts 116 through 122 for receiving CLK_IN, RESET, G_DI, DI0, DI1, DI2 and DI3 signals, respectively. A clock-out contact 124 applies the divided-by-forty 100 kHz signal (CLK_OUT) from a subcircuit 125 to the circuit 102. A phasing signal (PH_OUT) is applied to a contact 127, and is coupled as an input signal to AND-gates 128 and 129 shown in FIG. 4. Positive output signals from the gates 128 and 129 activate the pulsing devices 46 and 47 and the gated PH_OUT signal establishes the pulsing signal and its duty cycle or pulse width. As shown in FIG. 5, selected states of the divide-by-forty subcircuit 125 are coupled as input signals to four-input multiplexing devices 136 and 137. The devices 136 and 137 are set in accordance with the signal states of DI0 through DI3 applied through data latches 138 through 141.

The subcircuit 125 includes particularly a divide-by-four 2-bit counter 151 and a divide-by-ten 5-bit counter 152. As shown in FIG. 5, three states from the counter 151 and a ground signal are applied as input signals to the multiplexing device 136. Three states from the counter 152 and a high signal (VCC) are applied to the multiplexing device 137. The multiplexed output signals are further gated and applied through a flip-flop circuit 155 to an output gate circuit 156 to generate the pulse width determining duty cycle and pulsing frequency of the pulsing signal.

The application of the four data signals (DI0 through DI3) is used to determine a preferred duty cycle range between 20% and 57.5% of each 100 kHz pulsing cycle in 2.5% increments. Representative logic states of the data latches 138 through 141 in their respective order and how the logic states of the latches might determine the resulting duty cycle of the pulsing devices 46 and 47 are set forth below.

| Latch State DI0 through DI3 | Duty Cycle |
|---|---|
| 0 0 0 0 | 20% |
| 0 0 0 1 | 22.5% |
| 0 0 1 0 | 25% |
| 0 0 1 1 | 27.5% |
| 0 1 0 0 | 30% |
| 0 1 0 1 | 32.5% |
| 0 1 1 0 | 35% |
| 0 1 1 1 | 37.5% |
| 1 0 0 0 | 40% |
| 1 0 0 1 | 42.5% |
| 1 0 1 0 | 45% |
| 1 0 1 1 | 47.5% |
| 1 1 0 0 | 50% |
| 1 1 0 1 | 52.5% |
| 1 1 1 0 | 55% |
| 1 1 1 1 | 57.5% |

Referring now to FIG. 7, there is shown a preferred embodiment of a panel drive circuit for the panel 12, designated generally by the numeral 160. The circuit 160 is a particular embodiment of the drive circuit 40, as functionally described with respect to FIG. 3. The timing and control circuit 85 described with respect to FIGS. 4 and 5 is particularly applicable to control the operation of the drive circuit 160. The circuit 85 receives its clocking pulses as described from a typical crystal oscillator signal input as is schematically represented by the crystal 100. The described QPH1 and QPH2 signal outputs from the circuit 85 are applied to the gates of N-channel MOS transistors 46 and 47, respectively. The transistors 46 and 47 are preferred pulsing devices for the circuit 160 because of their high speed and low on-resistance. A power source 162 is selectively applied by the operation of the transistors 46 and 47 to the primary windings 43 and 44 of the transformer 42.

Selective switching of charging and discharging currents to the terminal 17 of the panel 12 is accomplished by optically coupled silicon controlled rectifiers 66 and 67 (SCR switches) functioning as the described switches 66 and 67. The optically controlled SCR switches 66 and 67 require positive trigger signals on optical trigger terminals 164 and 165, which are provided by the output signals LED1 and LED2 of the circuit 85. The trigger signal may be a typical pulsed signal since the SCR switches 66 and 67 remain in a conductive state as long as current flow through the switches 66 and 67 continues. Typical current limiting resistors 166 and 167 for the signals LED1 and LED2 may be coupled into the signal path to ground on either side of the respective switches 66 and 67. SCR trigger terminals 170 and 171 include a bias network, a typical arrangement of a capacitor 172 coupled in parallel with a resistor 173 to bias the conventional trigger terminal 170 and 171 to support continued operation for the duration of current flow through the switches 66 and 67. As will be realized in reference to FIG. 4, the respective SCR switch 66 or 67 may be activated by a signal pulse applied to the respective terminal 164 or 165 to initiate a voltage reversing positive or negative current flow from the capacitor 59 and the terminal 17 of the panel 12. In addition, as previously described and explained, the SCR switches 66 and 67 are preferably activated continuously during each of the pulsing periods of the pulsing transistors 46 and 47. The pulse width of the pulsing current applied to the primary windings 43 and 44 by the transistors 46 and 47 may be regulated by respective data inputs as signals DI0 through DI3, as indicated by the data input line at 175.

Connection "A" shown at each of the terminals 18 and 55 may be coupled to a common ground, as shown in reference to FIG. 3, and have continuity through the ground reference. As an alternative, the connection "A" may couple the secondary winding 52 directly to the terminal 18 of the panel 12 and the external capacitor 59, without the terminals 18 and 55 of these elements becoming coupled to a common ground. In such an alternate embodiment, the secondary loop through the secondary winding 52, the external capacitor 59 and the panel 12 is isolated and operates with a floating voltage with respect to ground. In this latter embodiment, the voltage profile at the terminal 17 represents a voltage profile across the terminals 17 and 18 of the panel 12, but is not referenced to ground. The ground level referred to in the description of the voltage profile across the panel 12 in relation to FIG. 6 becomes an electrically neutral voltage across the panel 12, though undefined with respect to any ground, such as in a primary path, for example.

As will be recognized from the above description of the general circuit for generating a profile of a voltage cycle applied to an electroluminescent panel 12, many changes and modifications may be possible as part of the described invention.

Advantageously, the described drive circuit does not depend on a tuned or resonant circuit, as is the case in prior art drive circuits for electroluminescent panels. The described circuit takes advantage of excess and non-used charges on the panel 12 and the external capacitor 59 during voltage reversals in each power cycle by storing energy from the discharging charges from the panel in the inductor of the high frequency transformer 42. Significantly, the inductance of the transformer 42 is not chosen to form a resonant or tuned circuit with the capacitance of the combined panel 12 and capacitor 59. Instead the inductance is configured and chosen to minimize the size of the transformer 42 in furtherance of providing a drive circuit, such as the circuits 40 and 160, which is particularly compact for use in conjunction with portable data terminals having display screens to be illuminated by the electroluminescent panels 12. The described circuits 40 and 160 are readily adapted to drive any one size of screens of a range of frequently used screen sizes FIG. 8 depicts schematically the computerized data terminal 10 as a device which features as an example the LCD screen 11 which falls within a range of screen sizes to which the described circuits 40 or 160 are advantageously applied. The data terminal 10, besides the visual output of the LCD screen 11, would generally also include some kind of keyboard, an alphanumeric keyboard 181 being given as an example. The computerized data terminal 10 may have, for example, a preferred size of the LCD screen 11 of approximately two square inches. Referring back to FIG. 7, the low resistance path between the external capacitor 59 and the secondary winding 52 provides for a transfer of charges to the diode isolated side of the charging circuit 160, to permit various sizes of the panel 12 to be powered with similar efficiency. The exemplary two inch area of the panel 12 in the data terminal 10 may have a capacitance of approximately 10,000 picofarads. To efficiently drive the panel 12 of such size, the externally coupled capacitor 59 may desirably be a 4700 picofarads, 100 volts, capacitor. The depicted computerized data terminal 10 is, however, an example of a size of a display screen at a low end of a range of screen sizes which may advantageously be illuminated by the described circuit. It should be understood that when screens substantially larger than the exemplary screen 11 of the data terminal 10 are to be illuminated, different space considerations may apply and the described circuit 160 may accommodate a transformer 42 with increased power characteristics and a capacitor 59 with a correspondingly larger capacitance. Various configurations in the transformer 42 meet criteria conducive to the practice of the invention. Also, various switches or switching circuits which are currently known may be used in substitution of the described circuit elements.

Various other changes and modifications in the structure of the described embodiments are possible without departing from the spirit and scope of the invention which is sought to be defined by the following claims.

What is claimed is:

1. A process for driving an electroluminescent panel having two terminals, comprising:

(a) providing a series of high frequency positive current pulses to a first terminal of said electroluminescent panel so as to ramp up the voltage provided at said first terminal; with respect to the second terminal (b) providing a series of high frequency negative current pulses, between said high frequency positive current pulses, to said first terminal of said electroluminescent panel so as to ramp down the voltage provided at said second terminal; and said first terminal with respect to (c) controlling the width of the high frequency positive and negative pulses so as to provide output control by selectively altering the time period between pulses whereby the time for ramping up and ramping down the voltage to the panel is controlled.

2. The process of claim 1, further comprising the step of adjusting the period between said pulses according to ambient light conditions.

\* \* \* \* \*